May 16, 1944.  W. H. KOPITKE  2,349,178
METHOD OF AND APPARATUS FOR EXTRUDING AND
BLOWING ORGANIC PLASTIC MATERIALS
Filed Aug. 4, 1941   6 Sheets-Sheet 1

Inventor
William H. Kopitke
by Brown Burnham
Attorneys

Witness
W. B. Thayer

May 16, 1944.  W. H. KOPITKE  2,349,178
METHOD OF AND APPARATUS FOR EXTRUDING AND
BLOWING ORGANIC PLASTIC MATERIALS
Filed Aug. 4, 1941   6 Sheets-Sheet 4

Witness
W. B. Thayer

Inventor
William H. Kopitke
by Brown + Parham
Attorneys

May 16, 1944.   W. H. KOPITKE   2,349,178
METHOD OF AND APPARATUS FOR EXTRUDING AND
BLOWING ORGANIC PLASTIC MATERIALS
Filed Aug. 4, 1941   6 Sheets-Sheet 5

Inventor
William H. Kopitke
by Brown & Parham
Attorneys

Witness
W. B. Thayer

Patented May 16, 1944

2,349,178

UNITED STATES PATENT OFFICE 2,349,178

METHOD OF AND APPARATUS FOR EXTRUDING AND BLOWING ORGANIC PLASTIC MATERIALS

William H. Kopitke, West Hartford, Conn., assignor to Plax Corporation, Hartford, Conn., a corporation of Delaware Application August 4, 1941, Serial No. 405,310

19 Claims. (Cl. 18—5)

This invention relates to the extruding and blowing of organic plastic material (hereinafter referred to as plastic) by first shaping the plastic into a tube the leading end of which is closed so that when or as the tubular shape is extruded, it may be formed into a bubble which may be expanded and developed into a hollow article by blowing.

An improved automatic machine and process for the above purpose is disclosed in my copending application Serial No. 378,551, filed February 12, 1941, of which this application is a continuation in part.

The general object of the present invention is to provide a new and improved process and extrusion apparatus in order to more efficiently shape plastic into tubular form, to close the leading end thereof and to afford better control of the flow of the tubular material in order to improve the quality and distribution of plastic in the hollow articles which are finally produced from the tubular material.

Among the more specific objects of the invention are to reduce or eliminate longitudinal welds, lines or unevenness which tend to form when the plastic is given tubular shape; to provide for better control of the thickness of the extruding tubular material so that more uniform distribution of the plastic may be obtained circumferentially of the finished articles; to correct circumferential differences in temperature and viscosity so that more uniform expansion of the tubular material is made possible; and to so improve the closing of the leading end of tubular material as to insure that the end closure or weld will be always of adequate thickness and strength and will be of good appearance.

In order that the invention may be fully understood and its advantages appreciated two embodiments thereof are disclosed in the accompanying drawings and described in the following specification. It will be understood that various changes may be made in the details of construction of the illustrated embodiments within the scope of the appended claims except insofar as the claims may be limited expressly to specific features of said embodiments.

Figures 9, 9A:
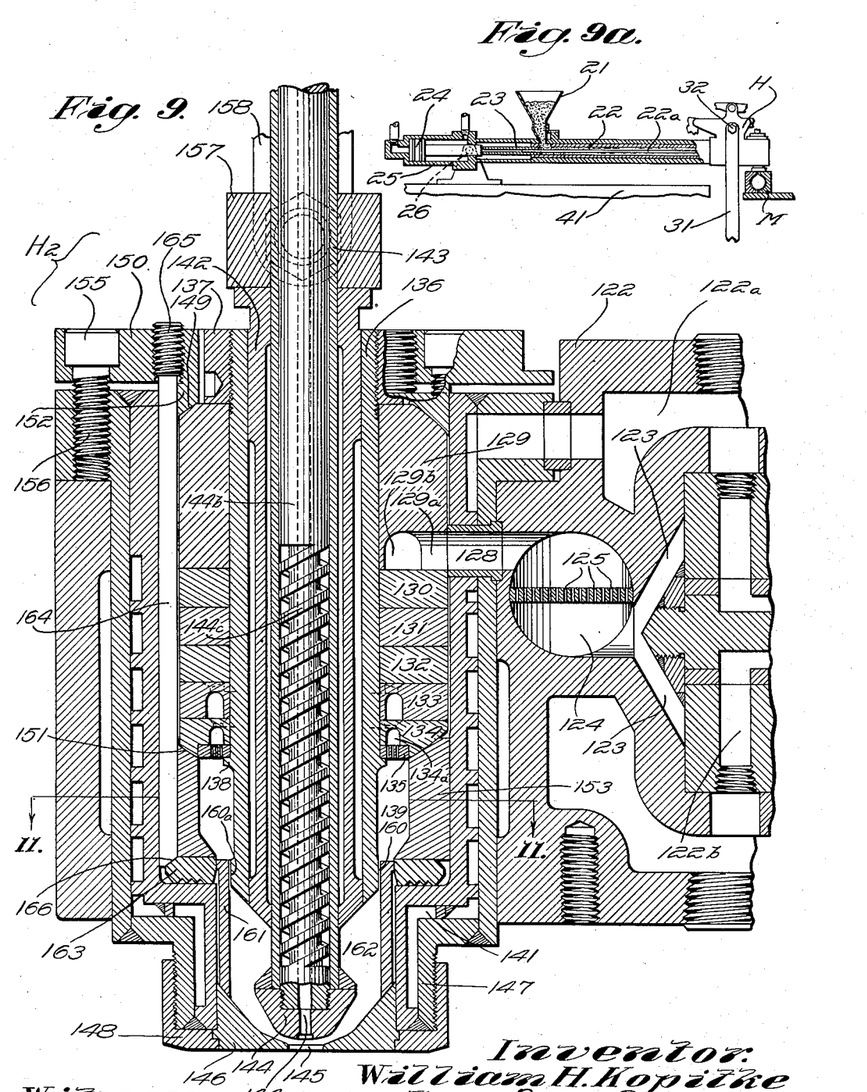
Fig. 9 is a full scale view in vertical section of another form of extrusion head embodying the invention and taken on the lines 9—9 of Fig. 10.
Fig. 9a is a view on reduced scale of an extrusion unit embodying an extrusion head of the general type shown in either Fig. 1 or Fig. 9.
Figures 12, 13, 14, 15, 16, 17, 18, 19, 20:
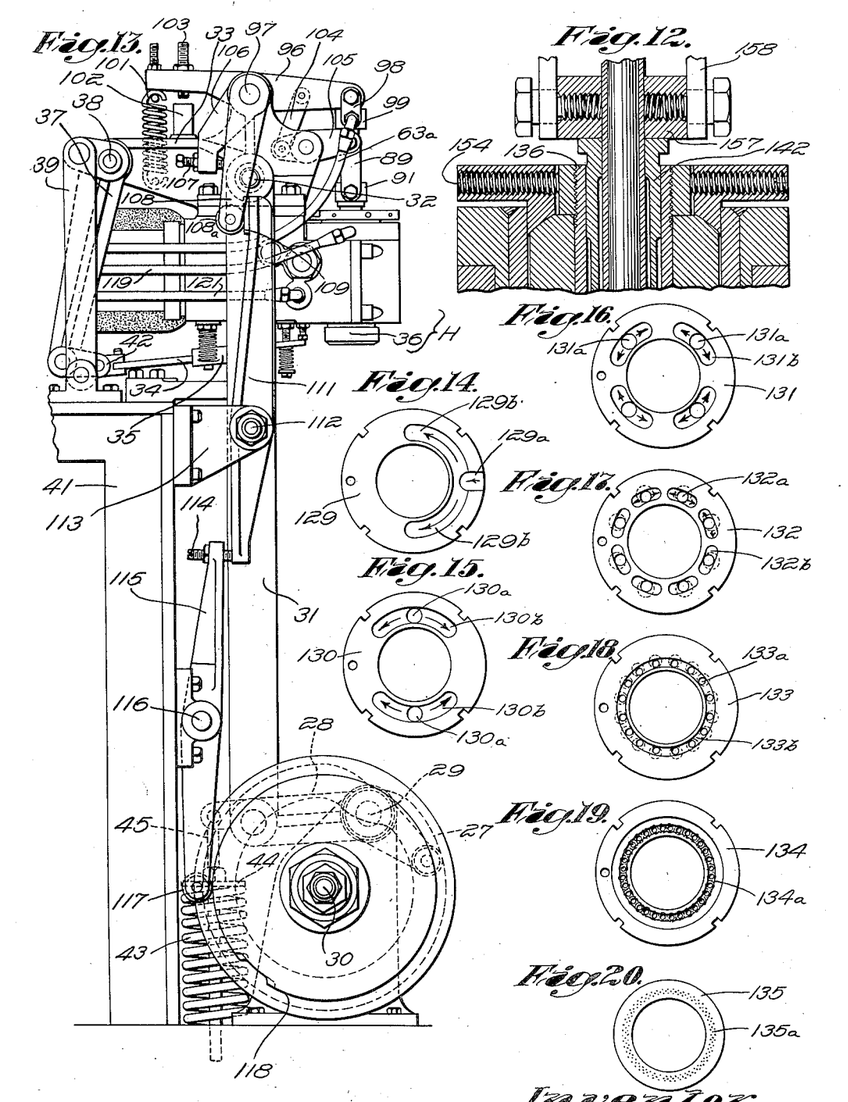
Fig. 12 is a view in vertical section of the upper portion only of the extrusion head of Fig. 9, taken on the line 12—12 of Fig. 10 and showing parts for adjusting the air tube mounting.
Fig. 13 is a view principally in side elevation and on reduced scale of a portion of a machine in which the extrusion heads of Fig. 1 or 9 may be employed.
Figs. 14 to 20 inclusive are views in bottom plan of several rings respectively showing passages therein for progressive sub-division and circular distribution of plastic when assembled in superposed relation as shown in Fig. 9.

It is contemplated that the extrusion heads of this invention may be employed in suitable automatic or other more complete apparatus, such as is shown in Figs. 9a and 13 for forming hollow articles.

In such apparatus, plastic is introduced in granular or other form through a hopper 21 into an annular passage 22, formed around core 22a, the walls of which passage are heated by suitable means (not shown) and through which the plastic is forced in relatively thin section by a cylindrical ram 23 operated intermittently by piston 24 in cylinder 25. Reciprocation of ram 23 serves intermittently to force the plastic through the annular passage 22 as the plastic is heated up to or toward working temperature and at the same time provides the impulse which forces plastic through and out of the extrusion head H during each extrusion operation.

Each bubble may finally be blown in a mold M to form a hollow article, the mold being supported and operated in any desired manner, as shown for example in my copending application referred to above.

To engage and disengage the head H and the mold M, the apparatus of Fig. 9a, referred to herein as an extrusion unit, may be pivoted toward its rear end as shown at 26, and raised and lowered at its front end by mechanism shown in Fig. 13. This comprises a cam indicated at 27 which actuates a bell crank 28 pivoted at 29 and to the inner end of which vertical bars, one of which is shown at 31, are connected at their lower ends. Each bar 31 is connected at its upper end to a pivot 32 on casting 33 of the extrusion unit. The cam 27 is mounted on shaft 30 driven by suitable means, not shown.

The up-and-down motion of the extrusion unit may be utilized to operate a knife 34 mounted in a slide 35 in position for sliding contact with the flat-bottom of nozzle 36 of extrusion head H. This is accomplished by actuation of a bellcrank 37 pivoted on casting 33 at 38 and connected to vertical link 39, the lower end of which is pivoted on the frame 41, as shown. The bellcrank 37, being connected by link 42 to the knife 34, is rocked outwardly on the up movement and inwardly on the down movement of the unit, causing the knife to sever plastic depending from nozzle 36 and then to retract out of the way of the mold M.

A spring 43 serves to cushion the downward movement of the extrusion unit by its yielding resistance against a disc 44 on rod 45 connected to the inner end of bellcrank 28.

The construction shown in Figs. 9a and 13 is more fully described in my said copending application Serial No. 378,551, filed February 12, 1941. Other parts shown in Fig. 13 are described below with regard to the operation of the air tube and the plunger in the extrusion head.

Figures 1, 2:
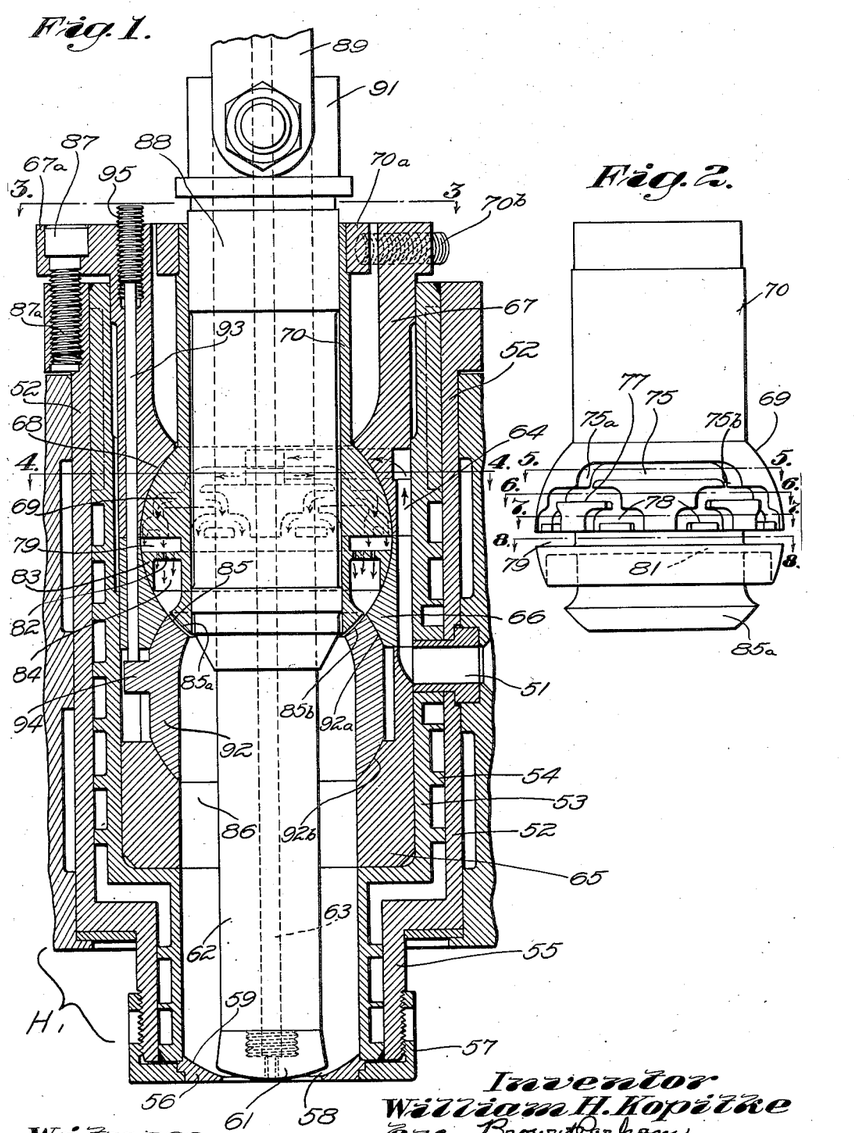
Figure 1 is a full scale, vertical sectional view of one form of extrusion head embodying the invention, said view being taken substantially on the lines 1—1 of Fig. 3.
Fig. 2 is a view in elevation showing separately the ball shaped mounting for the air tube of Fig. 1 and illustrating plastic distributing passages on the ball.

It will be understood that either the extrusion head of Fig. 1, referred to herein as head H1, or that of Fig. 9, referred to herein as head H2, may be used in place of the head H of Fig. 13 and when so used will receive plastic under pressure of ram 23, Fig. 9a, from the annular heating cylinder of passage 22, the ram 23 serving to force plastic through the head and to extrude it therefrom.

Referring now to Fig. 1, it will be seen that plastic from the heating chamber 22 flows in a solid stream into an inlet passage 51 of the extrusion head H1. The head comprises an outer wall 52 and an inner wall 53 provided with a double thread 54 which forms separate helical passageways between the walls for incoming and outgoing streams of oil or other fluid medium used to control the temperature of the head and of the plastic therein. The diameter of the casing is reduced at its lower end to form the nozzle 55 in which is mounted an orifice ring 56 held in place by a retaining ring 57 screw threaded on the nozzle. The ring 56 has an orifice therein and is made concave on its inner side at 59 to direct plastic beneath the convex tip 61 of the air tube and valve 62 and toward the center of the orifice 58 to assist in closing the leading end of the tubular material, as more fully explained below. The air tube 62 is utilized primarily to control the wall thickness of the extruded tubular material and for introducing air into the tubular material.

To transform the solid stream of plastic entering at 51 into a tubular stream, it is conducted upwardly through passage 64 formed in bearing members in the casing and which include the bottom member 65, the intermediate member 66 and the upper member 67. These members are all of annular form and fit slidably but closely in the casing, in which they are held under adjusted pressure, as later explained. If desired, the vertical passage 64 may be omitted and the passage 51 located where passage 64 terminates.

The upper and intermediate members 67 and 66 are shaped interiorly to form a spherical socket 68 in which fits the ball 69 of a tubular mounting 70 for the air tube 62. Members 67 and 66 fit together at the equator of the ball. This mounting provides for universal adjustment of the air tube as described below.

Figures 3, 4:
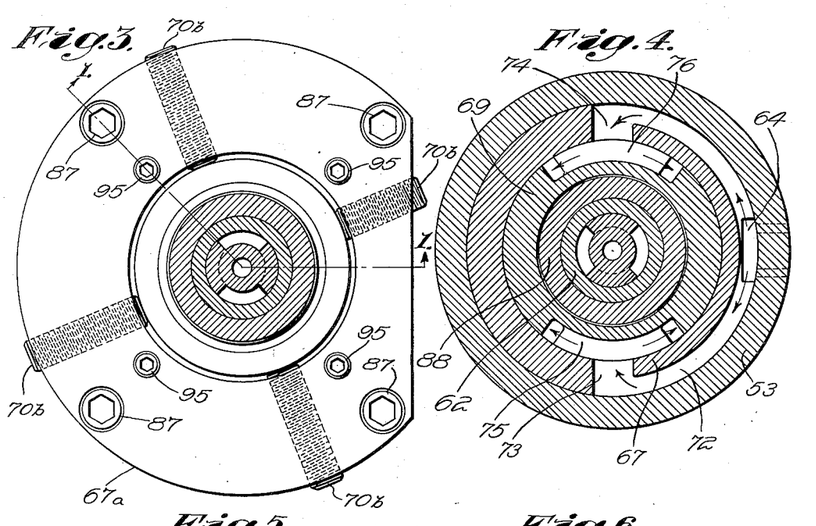
Fig. 3 is a sectional top plan view of the extrusion head taken on the line 3—3 of Fig. 1 showing certain adjusting screws in the top of the head.
Fig. 4 is a view in transverse section taken on the line 4—4 of Fig. 1 and showing the initial passages for dividing and circularly distributing a stream of plastic.
Figures 5, 6, 7, 8:
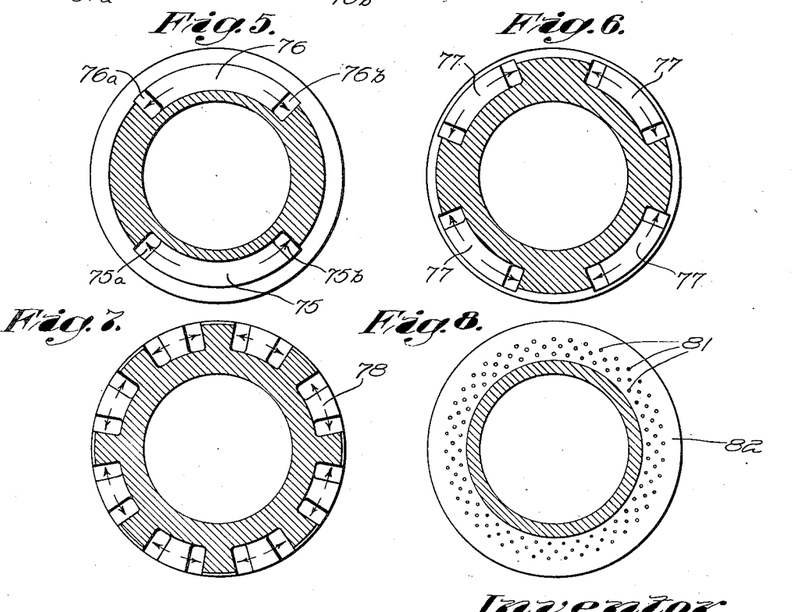
Figs. 5, 6, 7 and 8 are similar views taken on the lines 5—5, 6—6, 7—7, and 8—8 of Fig. 2 respectively, and showing additional passages for the progressive division and circular distribution of plastic in shaping it to tubular form.

As best shown in Fig. 4, the upwardly extending passage 64 communicates with a semi-annular passage 72 formed on the exterior of member 67. Thus, the stream of plastic from passage 64 is divided into two horizontal streams of about equal length, one of which leaves the passage 72 at exit 73 and the other at exit 74, which is diametrically opposite passage 73. These exits open downwardly into the middle of separate and diametrically opposed horizontal grooves 75 and 76, respectively, formed on the ball 69 and having at their ends exits 75a and 75b and 76a and 76b, Fig. 5, by means of which the two diametrically opposite streams of plastic are divided into four streams spaced substantially equidistantly in circular arrangement. In turn, these four exits open downwardly into four horizontal grooves 77 of about equal length and equidistantly spaced as shown in Fig. 6, each having exits at its ends so that the four streams are divided into eight streams, spaced circumferentially at approximately equal distances around the ball 69. These eight streams flow downwardly into eight horizontal grooves 78, Fig. 7, each having exits at its ends through which the plastic flows in sixteen streams circularly and equidistantly spaced into the full annular groove 79 which is filled with the plastic. From this groove, in which the plastic is initially welded into annular or tubular form, the plastic flows through a final ring of fine holes 81, Fig. 8, formed in a web 82 on which is formed the lower portion 83 of the ball. These holes preferably are very small and numerous and, as shown, may be arranged in a number of circular rows, one row within the other, and holes in each row being equidistantly spaced, but the holes being radially staggered.

Beneath the web 82 is an annular chamber 84 of substantial radial thickness and vertical depth and in which the plastic is again welded into annular form by heat and pressure. From this chamber the plastic passes through a narrow circular slot at 85 into a long annular conditioning and feeding chamber 86 surrounding the air tube 62 and extending to the orifice ring 56. Slot 85 is made very narrow (it may be only a few thousandths of an inch in width), so that the tubular plastic will be subjected to a powerful welding action when forced therethrough to insure the formation of a continuous colloid structure in tubular or annular form with minimum longitudinal weakness or other defects, such as result from poor welding. By subjecting this tubular stream to further heating in the relatively long chamber 86, it is made more homogeneous in viscosity and its viscosity is regulated to that most suitable for extrusion, blowing and end closing.

It will be noted that there is no break in or obstruction to the annular material from chamber 84 to and through orifice 58. This avoids slitting the material which would form a weak weld or seam and as would occur with webs or other obstructions.

Considering further the adjustment of the air tube 62 by adjusting the mounting thereof, it will be seen by reference to Figs. 1 and 3 that the tubular member 70 extends upwardly to the top of the extrusion head, the upper end of this tubular portion being reduced in diameter to receive a collar 70a which is engaged externally at four equidistantly spaced points by horizontal screws 70b threaded through the top flange portion 67a of the topmost member 67 of the ball and socket mounting.

It will be apparent that by properly adjusting the screws 70b, the ball portion of the mounting which supports the air tube 62 may be universally adjusted to adjust the lower end or tip of the air tube relative to the orifice 58. Thus the air tube may be adjusted to correct unevenness in wall thickness of the tubular material or to control "curling" thereof. This adjustment is necessary because of changes in dimensions and locations of the metal parts of the apparatus by warping or expansion caused by the application of heat thereto.

In order to permit movement of the ball in its socket to adjust the air tube as just explained, means are provided for applying just the right amount of pressure of the socket members 66 and 67 on the ball or for relieving somewhat the pressure of said members on the ball while the adjustment is being effected. This is accomplished by means of four screws 87 equidistantly spaced around the edge of the flange portion 67a, which screws rotate freely in said flange portion but are screw threaded, as shown at 87a, into the top of outer wall 52 of the extrusion head. By adjusting the screws 87, the desired clamping pressure may be exerted by the socket members 66 and 67 on the ball 69 to permit the ball to be adjusted, while preventing the escape of plastic between the ball and its socket. These screws also serve to hold all of the inner members in position, that is, the members 65, 66 and 67, within the inner wall 53 of the extrusion head. By entirely removing the screws 87, the inner parts of the extrusion head may readily be removed for cleaning, or other purposes.

The air tube 62 is not supported directly by the ball of the mounting 70 but slides within a tubular plunger 88 which in turn has a sliding fit within the member 70, as is clearly shown in Fig. 1. This plunger is for the purpose of applying an impulse to the plastic material in the chamber 86 to force the material across the orifice 58 and beneath the tip 61 of the air tube to assist in closing the leading end of the tubular material. This counteracts the pull of the air tube on the plastic at the orifice which otherwise would thin out the plastic on the leading end of the tubular material and make closing thereof difficult, if not impossible.

The plunger has a tapered lower end portion 88a to permit unobstructed flow of the plastic material out of the slot 85 into the chamber 86. The plunger 88 is forced downwardly by mechanism including a link 89 connected to a collar 91 slidably mounted on the air tube 62 and adapted to engage the top of the plunger. The complete mechanism for operating both the plunger and the air tube is described later with reference to Fig. 13.

It sometimes happens in the operation of extrusion apparatus of the type here involved that the tubular material is hotter and less viscous at one side of its circumference than at another. When this occurs, the plastic cannot satisfactorily be blown because the hotter side blows out too thin and the cooler side does not blow out enough and remains too thick.

I have discovered that such unevenness in temperature and viscosity largely, if not entirely, be eliminated by varying circumferentially the resistance to flow of tubular material through the extrusion head. To effect such variation in resistance circumferentially of the tubular material, the slot 85 is made locally adjustable in width. The slot 85 is formed between the two sides 85a and 85b, the side 85a being formed on an extension of the ball member 69 and the side 85b being formed on the adjustable ring 92. The side or surface 85a is spherically convex and has a radius slightly less than that of the ball 69. The side or surface 85b is spherically concave having the same radius as the ball 69 or socket 68.

The ring 92 constitutes in effect a spherical shell, the outer surface being made spherical as indicated at 92a and 92b and fitting corresponding bearing surfaces in the top and bottom of members 65 and 66. Thus the ring 92 and the slot side 85b may be universally adjusted by rocking the member 92 in its spherical bearing. This adjustment is effected by means of four vertical rods, one of which is shown at 93, which pass through the members 66 and 67 and the lower ends of which engage lugs, one of which is shown at 94, on the exterior of the shell 92 at their lower ends. At their upper ends the rods 93 are connected to screws 95 in the top of the member 67. Four of such rods and screws 95, may be provided as shown in Fig. 3. It will be understood that the pressure of the members 65 and 66 on the adjustable shell 92 will be regulated or adjusted by means of the screws 87.

The construction described permits establishing a different resistance to the flow of tubular material at one side or zone on its circumference from that existing at another side or zone, and in the construction of Fig. 1, this is substantially independent of the adjustment of the air tube 62 for the reason that when the air tube 62 is adjusted, only a very slight movement of the side 85a of the slot occurs. This movement is lengthwise of the slot and is very slight because the part 85a is relatively close to the center of ball 69 about which the air tube is adjusted. Therefore, when the air tube is adjusted, it is not necessary to make any change in the position of ring 92 and vice versa.

The operation of member 92 is more fully described below with reference to Figs. 28 and 29.

It also will be understood that in the illustrated construction, adjustment of ring 92 does not change the total resistance to flow of the slot 85.

Considering now the mechanism for operating the air tube 62 and the plunger 88 and referring to Fig. 13, it will be seen that the casting 33 on the top of the extrusion unit carries a lever 96 fast on a rock shaft 97 journaled in the casting and connected at its outer end by links, one of which is shown at 98, to a collar 99 on the upper end of the air tube. At its inner end there is connected to the lever 96 one end of a tension spring 101, the other end of which is anchored to the casting 33. Counterclockwise movement of the lever 96 is limited by a stop 102 on the casing which is struck by a screw 103 adjustably mounted in the inner end of the lever 96.

Connected to the lever 96 outwardly of the rock shaft 97 is a link 104 which in turn connects to the inner end of another lever 105 fulcrumed in the casting 33, the outer end of which is connected by links, one of which is shown at 89. As previously stated, link 89 is connected to collar 91 slidable on air tube 62 for operating the plunger 88. As a result of these connections between the lever 96 on the one hand and the air tube and plunger on the other hand, when the lever 96 is rocked in a direction to raise the air tube, lever 105 is rocked in a direction to force plunger 88 downwardly within the chamber 86 of the extrusion head; and when the lever 96 is rocked to lower the air tube, lever 105 is rocked in a direction to raise the collar 91, which permits the plunger to be raised by the exertion of pressure thereon by the plastic when pressure is applied by ram 23.

To operate the lever 96 and parts connected thereto, as above explained, a crank 106 is provided on rock shaft 97 and made fast thereon, said crank having an adjustable screw 107 at its lower end which bears against another arm 108 loosely mounted on rock shaft 97 and carrying a roller 108a at its lower end, which bears against a pad 109 on the upper end of vertical lever 111 pivoted at 112 in the bracket 113 fastened to the frame 41, as shown. Bearing against the lower end of lever 111 is the adjustable contact screw 114 in the upper end of another vertical lever 115 pivoted at 116 on the frame 41 and carrying at its lower end a roller 117 which bears against the cam 118 on shaft 30. The cam 118 is so shaped that at the proper times and in the desired manner the lever 96 is rocked to raise and lower the air tube or valve 62 and to simultaneously lower and raise or permit to be raised the tubular plunger 88. These operations may occur irrespective of the vertical position of the extrusion head because of the sliding contact of roller 108a on the pad 109.

The operation of the above-described apparatus in carrying out the novel process of the invention is as follows:

The ram 23, Fig. 9a, is reciprocated intermittently to force charges of plastic into the annular passage 22, successive charges being compressed and heated by suitable means associated with passage 22 (not shown) to form a stream which is gradually heated to working condition as it flows through the apparatus and is finally given a tubular form.

Upon each forward stroke of the ram, tubular material of the desired volume for an article is extruded from the orifice 58 of head H1. This is usually expanded by admission of air to the interior thereof through air tube 62, Fig. 1, during the extruding operation. See Fig. 25. A mold M, Figs. 9a and 21, is then closed about the expanded bubble which is blown in the mold to form the desired article, as shown in Fig. 9a, this being done in the interval between extruding operations.

During each interval between extruding operations, the tubular material at the orifice 58, Figs. 1 and 21 to 25, is closed so that the subsequently extruded material may be blown. It is very difficult to close tubular organic plastic material, particularly certain compositions which do not weld very easily. The problem in obtaining a good weld is to bring the material together with sufficient force or intimacy without unduly cooling or chilling it. The novel manner in which this is accomplished by the present invention is illustrated in Figs. 21 to 25.

Figures 21, 22, 23, 24, 25, 26, 27:
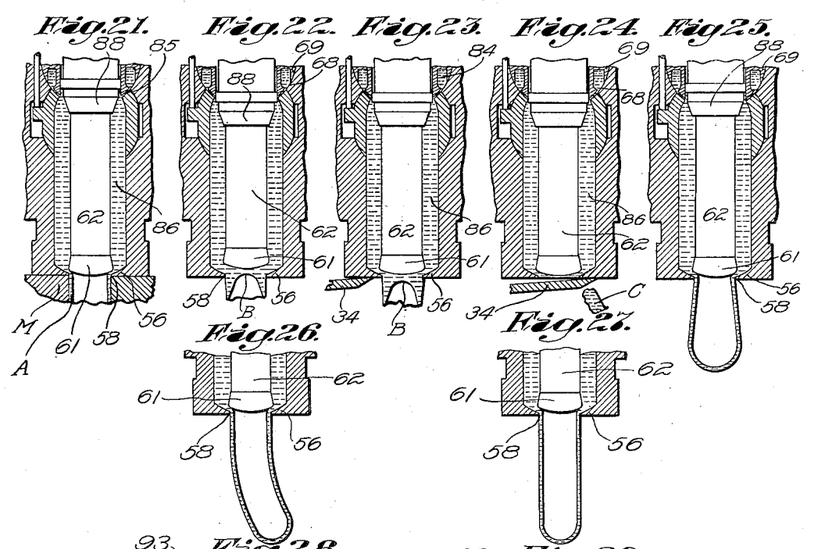
Figs. 21 to 25 inclusive are simplified views on reduced scale of the extrusion head of Fig. 1, showing several steps in extruding and closing the end of the tubular material.
Figs. 26 to 27 are similar views illustrating the control of curling by adjustment of the air tube.

Fig. 21 shows the parts of the extrusion head H1 at the time an article is being blown in mold M held against orifice ring 56. In this condition a tubular connection A extends from within the orifice and around the tip 61 of valve member 62, through orifice 58 into the mold. This connection may be burst by the blowing air and broken off by the removal of the mold M away from the orifice ring 56. The air tube and valve member 62 is in its lowermost position to which it was moved before extrusion began, to control the wall thickness of the tubular material. The valve member need not seat on the ring 59 at any time. In Fig. 21, plunger 88 is in its retracted position.

The tubular material at the orifice is now closed by raising air tube and valve member 62 from its lowermost extrusion regulating position of Fig. 21 (and Fig. 25) to its uppermost bottom closing position as shown in Fig. 22. This is necessary to permit sufficient plastic to pass the end of the tip 61 to properly close the tubular material.

Simultaneously with the elevation of the valve member 62, the plunger 88 is forced downwardly into the position shown in Fig. 22. This has two effects: first, it counteracts the tendency of the valve member 62 to draw the plastic away from the lip of orifice 58 and to thin the plastic so much that the closing of the material is prevented or interfered with; second, it positively applies an impulse to the plastic in chamber 86 causing it to flow downwardly toward the orifice and to flow radially toward the center of the orifice beneath the end of the valve member with sufficient force to close the tubular material with a strong weld as indicated at B, Fig. 22.

To facilitate the radial movement of the plastic under the impulse supplied by plunger 88, it is advantageous to make the inside of ring 56 concave and the valve tip 61 convex more or less as shown and also to proportion the tip 61 and orifice 58 so that the tip 61 overlies a marginal portion of the inside of the ring 56 to give radial direction to the movement of the plastic.

It also may be advantageous to make the downward stroke of plunger 88 long enough to extrude a little surplus material out of the orifice. The purpose of this is to insure that enough plastic to close the tube and form the bottom will be forced into the orifice.

From the foregoing description, it will be apparent that the closing of the tube is accomplished without touching the plastic with a chilling implement. Also the closing operation takes place largely within the orifice which is heated and so keeps the plastic for the end closure heated to welding temperature.

It is particularly to be noted that the impulse applied to the plastic to close the tube is entirely separate and distinct from the impulse applied by the ram 23 of Fig. 9a to extrude the plastic for an article.

As shown in Fig. 22, plastic depends from the material in the orifice, this being part of connection A. In fact, though not so shown, connection A may not have been entirely broken prior to this time. Also, the bursting of the connection, if it occurs, and the previous operations may leave plastic on the bottom of the nozzle. To remove such plastic, and if necessary to sever the connection, knife 34 is brought into engagement with the bottom of the ring 58, as shown in Fig. 23, and moved across it as indicated in Fig. 24, thus both severing the plastic and removing any plastic which may have been left in the nozzle, all as indicated at C, Fig. 24.

The severing operation may be utilized to improve the appearance of the weld formed at B. This is done by slightly lowering valve member 62 from the position of Fig. 22 to that of Fig. 23 which forces the weld B outwardly into the shearing plane of knife 34 with the result that the knife cuts a slice off of the bottom of the weld and gives it a smooth surface.

After the knife 34 is retracted, the end-closed tubular material begins to extrude as the result of the operation of ram 23. Throughout the extrusion, valve member 62 is held with its tip 61 at the right height above the orifice 58 to control or determine the wall thickness of the tubular material as shown in Fig. 25. This height may be varied as by adjusting the screw 103, Fig. 13. Upward adjustment of the member 62 increases the thickness of the tube formed and downward adjustment decreases the thickness of the tube formed.

Warping of the member 62, and other changes in the apparatus, due to the effect of heat thereon, and also changes or differences in the plastic, may cause the extruded material to curl as shown in Fig. 26. While this may not be objectionable in some cases, in other cases it interferes with the forming operation. To correct this condition the member 62 is moved to move its tip in a radial direction opposite to the direction of curling. Thus, with respect to Fig. 26, the tip 61 is moved to the left. This causes the tubular material to extrude in a straight line or in axial alignment throughout its length with the center of orifice 58, as shown in Fig. 27.

Sometimes the extruded material is too thin on one side. This may be corrected by moving the tip 61 of the member 62 in a direction radially opposite from the side where the wall is thin. The effect of this change in the position of the member 62 is immediate because it is made where the plastic issues from the apparatus. Such effect may in some cases result in curling of the extruded material somewhat as shown in Fig. 26. In other words, in some cases, it may be necessary to curl the extruded material deliberately to obtain circumferentially uniform wall thickness. However, this curling need not be so great as to interfere with proper closing of the mold around the bubble. Furthermore, it may be corrected by adjusting member 92 as explained below.

Such adjustments of the valve member 62 are effected by manipulating screws 70b, Figs. 1 and 3 (and, if necessary, screws 87 which may have to be loosened slightly) to turn the ball 69 in its socket 68 in the desired direction.

Although it might be supposed that apparatus of the type here involved might be so constructed and set up that uniform heating of the tubular material would be assured, this has been found not to be true. Changes in position of metal parts when heated and variations in the plastic material being operated upon may result in one side of the extruded material being hotter than the other. The effect of this is illustrated in Fig. 28 which shows a bubble which has expanded unduly and become too thin at D, because of the material being too hot on this side, while the material at E has remained relatively thick because of it being substantially cooler. In some instances the material at D may actually burst under low pressure air.

Figure 28:
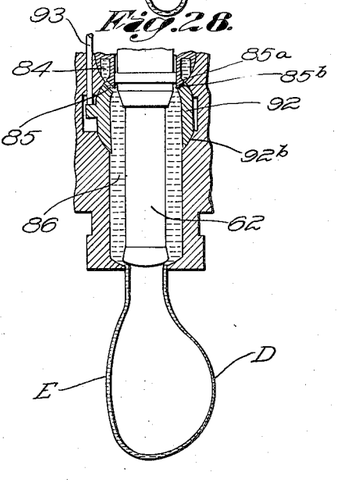
Figs. 28 and 29 are similar views illustrating the effect of equalizing the circumferential temperature and viscosity of the tubular material.
Figure 29:
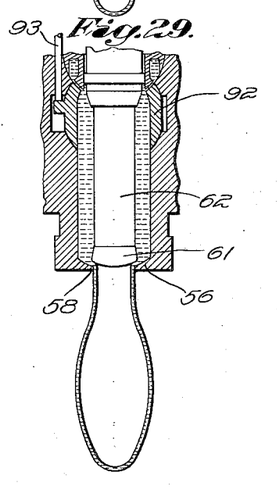

According to the present invention, this defect is remedied by locally adjusting the flow of plastic from the annular mass at 84 through slot 85 into the chamber 86 by changing the position of member 92 so as to make the slot 85 narrower at the left side of slot and wider at the right side of the slot, as will be seen by comparing Fig. 29 with Fig. 28. The effect of this is to retard the flow of material through the left side of chamber 86 to heat it longer and to increase the flow of the material through the right side of chamber 86 to heat it for a shorter period. This equalizes the temperature and viscosity of the extruded tubular material circumferentially thereof which therefore expands evenly under internal air pressure to form a symmetrical bubble, as shown in Fig. 29.

Member 92 is moved by manipulating screws 95, Figs. 1 and 3, which operate rods 93 which cause member 92 to turn in its spherical bearing 92b as desired.

Such adjustment of member 92 does not result in any change in the total resistance to flow of slot 85 nor does it change the position of member 62. Likewise, adjustment of member 62 does not change in any way the effective adjustment of member 92 because movement of ball 69 is slight and moves side 85a of the slot parallel to and not toward or away from side 85b on member 92.

However, member 92 may be utilized to modify the effect of member 62 on the extruding tubular material. For example, if, in order to equalize wall thickness of the extruding tube, member 62 is adjusted to a position which causes curling, this curling may be corrected by so adjusting member 92 as to increase the rate of flow at the side toward which the bubble is curling and to decrease the rate of flow at the other side of the bubble. This straightens the bubble.

The air tube 62 may be internally cored in a known manner for the passage of a temperature controlling medium therethrough. See Fig. 4. A suitable air connection may be made to the upper end of the air tube for the admission of blowing air to the air tube passage 63, as for example through a conduit 63a, shown in Fig. 13. Suitable conduits for the temperature controlling medium may be connected to the apparatus, such conduits being indicated at 119 and 121 in Fig. 13.

Figure 10:
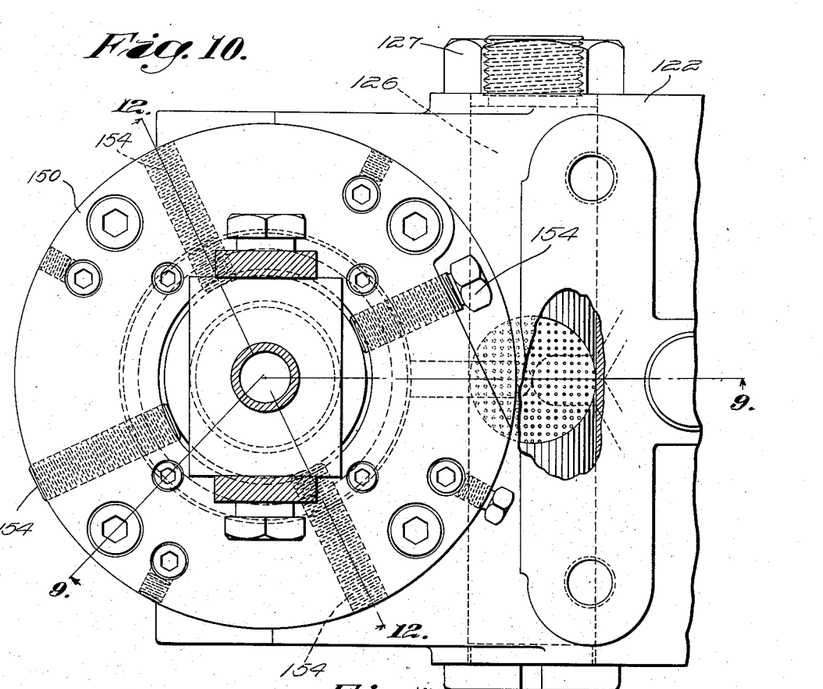
Fig. 10 is a view in top plan of the extrusion head shown in Fig. 9.
Figure 11:
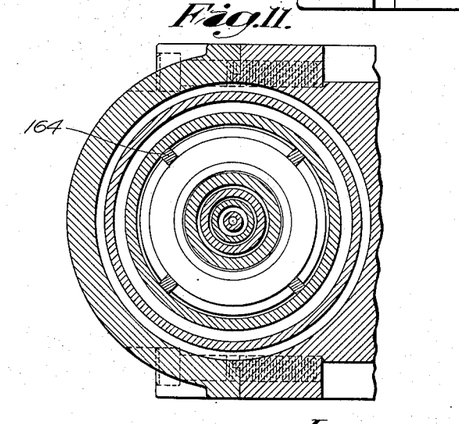
Fig. 11 is a view in horizontal section taken on the line 11—11 of Fig. 9 and showing particularly an adjustable ring for equalizing the flow of tubular material.

Considering now the form of the apparatus shown in Figs. 9 to 12 inclusive and 14 to 20 inclusive, there is partially shown at 122, Figs. 9 and 10, the outer end portion of an extrusion unit in which is mounted the head H2. The portion illustrated constitutes the head of a cylinder corresponding to the cylinder 25 of Fig. 9a and which is provided with heating passages partly indicated at 122a and 122b for the external and internal heating of the annular passage (not shown) provided in the said cylinder. The heated plastic leaves the cylinder through passages 123 which enter a chamber 124 containing a breaker plate 125 provided with numerous fine holes to hold back incompletely heated material until it is softened sufficiently to pass through said holes and also to hold back particles of foreign matter. The breaker plate 125 is formed in a rod 126, Fig. 10, which fits a hole in the cylinder head 122 and may readily be removed therefrom upon loosening a nut 127 to permit cleaning of the breaker plate.

From the chamber 124 the plastic flows in a solid stream through passage 128 which leads into the extrusion head proper. As in the case of the other embodiment, the embodiment under consideration provides for the division of this solid stream of plastic into groups of streams progressively increasing in number and circularly distributed; provides for universal adjustment of the air tube; and also provides for varying the circumferential resistance to the flow of tubular material to equalize the temperature and viscosity of the extruded tubular material around its circumference.

The progressive division of the stream of material and the circular distribution of streams is accomplished by means of ring members 129, 130, 131, 132, 133, 134 and 135, having passages presently to be described and clamped together on a sleeve 136 by means of a clamping ring 137 screw threaded on the top of said sleeve and engaging top member 129. This ring 137 serves to exert pressure through all of the ring members to press the lowermost member 135 against a shoulder 138 on the sleeve 136.

The passages formed in the members 129 through 135 are illustrated in Figs. 14 to 20 inclusive which show bottom plan views of the said ring members. Thus the member 129 has an inlet 129a formed on its bottom side, which inlet leads inot the semi-annual groove 129b. Groove 129b divides the initial stream into two horizontal streams of about equal length. These streams flow downwardly from the diametrically opposite ends of the groove 129b through holes 130a in the member 130 which enter two slots 130b formed in the bottom side of the member 130. The two slots 130b cause the two entering streams to be split into four horizontal streams of about equal length which flow from the ends of said slots downwardly through holes 131a in member 131 into horizontal slots 131b formed on the under side of the member 131. The slots 131b cause the four streams to be split into eight streams which pass downwardly through holes 132a into the member 132 into slots 132b formed in the bottom of said member 132. In like manner the eight streams are divided into sixteen streams by flowing downwardly through holes 133a in the ring 133 which lead into an annular groove 133b formed in the under side thereof.

From the groove 133b in the member 133 the plastic flows through thirty-two holes in the ring 134 which lead into a groove 134a formed in the bottom thereof and from this groove the plastic flows downwardly through fine holes 135a in the ring 135. These fine streams of plastic enter the annular chamber 139 surrounding the bottom portion of the sleeve 136, in which chambers these streams are welded into tubular form under heat and pressure, the heat being supplied by a medium circulated through passages indicated at 141 in the double-walled casing of the extrusion head as in head H1.

It will be noted that the holes and slots become progressively smaller in succeeding rings.

Mounted within the sleeve member 136 is the plunger 142 within which in turn is mounted the air tube 143 carrying a tip 144 which cooperates with the orifice 145 of orifice ring 146 clamped within the bottom of the nozzle 147 of the extrusion head by means of the bushing 148.

Universal adjustment of the tip of the air tube is effected in substantially the same way in the construction of Fig. 1 except that the spherical bearing surfaces in Fig. 9 are much smaller in area than in Fig. 1. These surfaces are formed at 149 on the top member 129 and at 151 on the member 134. The surface at 149 is engaged by the internal downwardly projecting flange 152 of the top clamping ring 150. Flange 152 is spherically concave on its bottom surface to fit the surface 149. Similarly the member 134 bears against a spherically concave surface on the top of ring 153 which provides the outer wall of the annular passage 139.

Adjustment of the air tube 143 on its spherical bearing is effected by means of the horizontal set screws 154, four of which are threaded into the ring 150, as shown in Fig. 10. The inner ends of these screws bear against the outside of the clamping ring 137 and when adjusted move the air tube assembly comprising the ring members 129 through 135, the plunger 142 and the air tube 143 to adjust the tip 144 of the air tube with respect to the orifice ring 145. Thus, universal adjustment of the air tube may be made from the exterior of the extrusion head. This adjustment may be made during operation of the apparatus.

The desired clamping pressure on the spherical mounting of the air tube is exerted in substantially the same way as in Fig. 1, the vertical screws 155 being freely rotatable in the clamping ring 150 and screw threaded into the top of the extrusion head casing as indicated at 156. These screws may thus be utilized to adjust the clamping pressure on the air tube assembly, so that it may be adjusted on its spherical bearing while the leakage of plastic is prevented, or the clamping pressure may be relieved sufficiently for the purpose of permitting such adjustment to be made and the previous pressure thereafter restored. Upon removal of all of the screws 155, the entire air tube assembly together with clamping ring 150 may be removed from within the head as a unit.

The air tube is provided with a passage 144a therethrough for blowing air to be admitted into the tubular material extruded through orifice 145. Said tube may also be provided with a core 144b having a double thread, as indicated at 144c, for the circulation within the air tube of temperature controlling medium.

The plunger 142 and air tube 144 are operated in substantially the same way and by substantially the same connections as the plunger 88 and air tube 62 of Fig. 1, all as described with reference to Fig. 13. These connections include a collar 157 adapted to engage the top of the plunger 142 and having links 158 connected thereto and which correspond to the links 89 of Figs. 1 and 13. The connections for the air tube 144 are those disclosed in Fig. 13 and described with reference to air tube 62 of Fig. 1.

From the annular chamber 139, the tubular plastic flows through a narrow slot 160 formed between a cylindrical end portion 160a of the sleeve 136 and the inner cylindrical surface of a ring 161. This serves to apply a powerful welding action to the plastic material before it flows into the final feeding and heat conditioning chamber 162 which is formed mainly within the nozzle 147 of the extrusion head. This narrow slot also serves the purpose of setting up back pressure against the plastic in the apparatus to insure that its density will be increased to the maximum and it will be efficiently heated when subjected to the pressure of the extrusion ram 23 in the extrusion cylinder 25.

The ring 161 is held within the extrusion head by orifice ring 146 against which the bottom of the ring is fitted, as shown in Fig. 9. As in the case of the construction of Fig. 1, the construction of Fig. 9 includes means for varying the width of the slot 160 to equalize the temperature and viscosity of the plastic in the extruded material circumferentially thereof. To this end the ring 161 is fitted into a flat ring 163 on the bottom of the inside of the extrusion head beneath the inner wall member or annulus 153 previously referred to and which rests thereon. The ring 163 may be moved horizontally by means of vertical rods 164, Figs. 9 and 11, the upper ends of which are engaged by screws threaded into the top clamping ring 150, as shown at 165, and the bottom ends of which are beveled, as shown at 166, to fit a corresponding beveled surface on the outer edge portion of the ring 163. Thus when a rod 164 is forced downwardly, its lower end wedges the ring 163 away from the rod thus moving the flow restricting ring 161 horizontally to decrease the width of the part of slot 162 which is closest to the rod so adjusted. This also increases the width of the slot on the opposite side. This does not change the total resistance offered by the slot but does change the local resistance to flow.

The construction shown in Fig. 9 has the advantage over that shown in Fig. 1 of greater facility for removal of the flow resistance ring. Thus, if a particle of hard material lodges within the slot which particle slits the tubular material, such particle may be quickly removed simply by unscrewing the bushing 148 and removing the orifice ring 146 and the flow restricting ring 161. This may be done without disturbing the adjustment of the air tube 143 with respect to the orifice 145 and without changing the adjustment of ring 161 itself. However, unlike the construction shown in Fig. 1, if the air tube is adjusted to a new position on its spherical bearing, the adjustment of the flow restricting ring has to be changed to re-establish the previously existing adjustment of the slot 160 for the reason that the adjustment of the air tube appreciably moves the inner wall 160a of the slot. In other words, in head H2, the air tube is not adjustable independently of the adjustment of the flow resistance means as it is in head H1.

With exceptions which will be obvious from the foregoing, the operation of the embodiment of Fig. 9 is the same as that of Fig. 1 and therefore need not be described more fully.

Having thus described my invention, what I desire to claim and secure by Letters Patent is:

1. In the art of forming organic plastic material into a tube by heating said material in and extruding it through the orifice of extruding apparatus, the steps comprising forming said material into a solid stream, dividing said stream into a plurality of groups of individual streams, progressively increasing the number of streams in successive groups by individually sub-dividing the streams of each group, distributing the streams of each group substantially equidistantly from each other about an axis, merging the streams of the last group into material of tubular form, flowing said material longitudinally through and heating it in said apparatus while maintaining circumferential resistance to the flow of the tubular material within said apparatus and inwardly of said orifice, adjusting such resistance so as to increase the flow of material and decreasing the time of heating thereof at one side relative to the rate of flow at another side to equalize the temperature and viscosity of the extruded tube circumferentially thereof, regulating the flow of the tubular material through said orifice by holding the end of an air tube in cooperative relation to said orifice, and adjusting the end of said air tube transversely of the center of said orifice to cause the tube issuing therefrom to be straight and to be formed in axial alignment with said orifice throughout its length, thus preventing curling of said tube as it is extruded.

2. Apparatus for extruding and blowing organic plastic material to form hollow shapes which comprises a vertical extrusion head having an orifice in the bottom thereof through which said plastic is discharged and suspended in tubular form, an air tube mounted in said head with one end thereof in cooperative relation to said orifice, a ball and socket mounting for supporting said air tube, said air tube being mounted in said ball, said socket being formed in separate internally spherical parts, means causing said parts to exert clamping pressure on said ball to hold it in position and means for adjusting said ball in said socket to adjust the end of said air tube laterally with respect to the center of said orifice whereby said tubular material may be formed and suspended in axial alignment with said orifice.

3. Apparatus for forming organic plastic material into a tube by extrusion thereof through an orifice in said apparatus, said apparatus comprising means for shaping said material into tubular form, means cooperating with the orifice of said apparatus for regulating the flow of tubular material through said orifice, means in said apparatus in advance of said orifice for maintaining a circumferential resistance to flow of the preliminarily formed tubular material, means for adjusting the flow resistance means to regulate the flow resistance at one side of the tubular material relative to that at another side thereof, and means for adjusting said flow regulating means cooperating with said orifice transversely of said orifice without substantially changing the adjustment of said flow resistance means.

4. Apparatus for forming organic plastic material into a tube by extrusion thereof through an orifice in said apparatus, said apparatus comprising a passageway for the flow of plastic material in a solid stream, an air tube in said apparatus cooperating with the orifice thereof for regulating the flow of tubular material through said orifice, a ball and socket mounting for said air tube, and passageways formed on the ball portion of said mounting for dividing said solid stream of material into a plurality of groups of streams progressively increasing in number, said passageways being arcuate in shape and being arranged to distribute the said streams of material substantially equidistantly from each other about a vertical axis extending through said ball, and ports leading from the ends of some of said arcuate passageways into other arcuate passageways respectively.

5. In apparatus for forming organic plastic material into a tube for extrusion thereof through an orifice of said apparatus, said apparatus comprising means for imparting preliminary tubular shape to the plastic material, a narrow flow-resistance passage in said apparatus inwardly of said orifice for circumferentially resisting the flow of said tubular material therethrough, one sidof said passage being formed on a ring member, a spherical bearing for said ring member, and means for adjusting said ring member on its spherical bearing to adjust the resistance to flow of said passage in one zone relative to the resistance effected thereby in another zone circumferentially of the said passage.

6. In the art of forming organic plastic material into hollow shape by heating said material in and extruding it through the orifice of extruding apparatus, the steps comprising imparting a tubular form to the plastic material in said apparatus, intermittently extruding the material in the desired tubular form through said orifice, controlling the thickness of the tubular material during extrusion thereof by means of a valve member, and closing the tubular material at the orifice in each interval between extrusions by elevating the valve member, and applying an impulse to the material ahead of said orifice to cause it to flow toward said orifice and toward the center of said orifice, whereby the said material is caused to weld together.

7. In the art of forming organic plastic material into hollow articles by extruding and blowing such material, the steps comprising imparting tubular form to said plastic material in extruding apparatus, extruding said material in the desired tubular form through an orifice of said apparatus, regulating the flow of the tubular material through said orifice by holding the end of a valve member in close proximity to the inner side of said orifice, discontinuing the extrusion of said material, retracting the said valve member, and applying an impulse to the plastic material ahead of said orifice simultaneously with the retraction of said valve member to cause the plastic material to flow toward said orifice and to flow toward the center of said orifice to close positively the tubular material, severing the previously extruded material from the material remaining in the apparatus, and extruding the end-closed tubular material.

8. Apparatus for forming articles from organic plastic material, comprising an extruder, said extruder including an extrusion head having a discharge orifice therein, means for forcing plastic material through the extruder and for extruding the plastic material through the orifice of said head, means including a valve member for shaping the plastic material into a tube as it extrudes from said orifice, means for lowering and raising said valve member, and means for applying an impulse to the plastic material ahead of said orifice to close the tubular material at said orifice constituting the leading end of the tube to be extruded.

9. Apparatus for forming articles from organic plastic material, comprising an extruder, said extruder including a head having an orifice therein through which plastic material is extruded, means for forcing plastic material through said extruder and out of said orifice, means for shaping the plastic material into tubular form as it passes through said orifice, the last named means including a valve member, means for lowering and raising said valve member, plunger means for applying an impulse to the plastic ahead of said orifice to force the plastic material toward the orifice as said valve member is elevated, and means for operating said plunger means to apply the said impulse in timed relation to the elevation of the said valve member.

10. Apparatus for forming articles from organic plastic material comprising an extruder, said extruder including a head having a discharge orifice therein, means for forcing plastic material through said extruder and through the orifice in said head, a valve member in said head cooperating with the said orifice, a tubular plunger slidably mounted on said valve member, means for moving the valve member toward and away from the said orifice, and means for actuating the plunger to cause it to force plastic material toward said orifice, as the valve member is retracted therefrom.

11. In the art of forming organic plastic material into hollow articles by extruding and blowing such material, the steps comprising imparting tubular form to said plastic material in extruding apparatus, extruding said material in the desired tubular form through an orifice in said apparatus, regulating the flow of the tubular material through said orifice by holding the end of a valve member in close proximity to the inner side of said orifice, discontinuing the extrusion of said material, retracting the said valve member, and applying an impulse to the plastic material ahead of said orifice simultaneously with the retraction of said valve member to cause the plastic material to flow toward said orifice and to flow toward the center of said orifice to close the tubular material, extruding a small amount of surplus material, severing said surplus material from the material remaining in the apparatus, and extruding the end-closed tubular material.

12. In the art of forming organic plastic material into hollow shapes by heating said material in and extruding it through the orifice of extruding apparatus, the steps comprising heating said material to workable condition, imparting annular form to a mass of said heated material, forcing material from said mass in annular form longitudinally through a narrow passage into an annular heat conditioning and feeding chamber and thus applying a welding action to said material, subjecting the plastic in said chamber to heat and pressure, extruding the material from said chamber in the form of a tube, regulating the extrusion from said chamber to control the thickness of said tube, and locally regulating the thickness and hence the rate of flow and time of heating of the annular material flowing into said chamber to equalize the temperature and viscosity of the extruded tube circumferentially thereof whereby it may be uniformly expanded.

13. In the art of forming organic plastic material into a tube in heating and extruding apparatus wherein the plastic material tends to be heated so that the viscosity of the tube which is extruded is lower at one side thereof than at another, the steps comprising shaping such material into tubular form and flowing it longitudinally through and heating it in said apparatus, applying circumferential resistance to the longitudinal flow of the tubular material through the apparatus inwardly of the point of extrusion, adjusting such resistance along one portion of the circumference of the tubular material so as to decrease such resistance, increase the flow of and decrease the heating of such portion in the apparatus thereby to increase the viscosity of the aforesaid side of the tube, flowing the tubular material into and through a heating and feeding chamber, and extruding the tubular material around an internal forming member and through an orifice to form the tube.

14. Apparatus for forming organic material into a tube by heating and extrusion, comprising an extrusion head, means for forcing said material into and through said head, means in said head for imparting tubular form to said material and for exerting resistance to longitudinal flow of said tubular material around its entire circumference, means for heating said head to heat said tubular material during its passage therethrough, means for adjusting said flow resistance means transversely of said tubular material to vary the rate of flow and the time of heating of a circumferential portion of said tubular material relative to another circumferential portion thereof, a heating and feeding chamber for receiving said tubular material, and an extrusion orifice and an internal forming member associated with said chamber for forming said tube.

15. Apparatus for forming organic plastic material into a tube by heating and extrusion, said apparatus comprising an extrusion head, means for causing said material to flow into and through said head, means in said head for imparting tubular shape to the plastic material, means providing a narrow passage in said head inwardly of the point of extrusion from said head for maintaining resistance to longitudinal flow of said tubular material around its entire circumference during its passage through said head, said last named means including a ring, means for adjusting said ring transversely of the axis of said tubular material to vary the resistance to the longitudinal flow of one portion of said tubular material relative to another portion thereof, an orifice ring associated with said head and an internal forming member associated with said orifice ring to form the tube, means removably attaching said orifice ring to said head, and means for removably supporting said first named ring within said head.

16. In the art of forming organic plastic material into a tube in heating and extruding apparatus wherein the plastic material tends to be heated so that the viscosity of the tube which is extruded is lower at one side thereof than at another, the steps comprising shaping such material into tubular form and flowing it longitudinally through and heating it in said apparatus, applying circumferential resistance to the longitudinal flow of the tubular material through the apparatus inwardly of the point of extrusion, adjusting such resistance along one portion of the circumference of the tubular material so as to decrease such resistance, increase the flow of and decrease the heating of such portion in the apparatus thereby to increase the viscosity of the aforesaid side of the tube, flowing the tubular material into and through a heating and feeding chamber, extruding the tubular material around an internal forming member and through an orifice to form the tube, and relatively adjusting said member and said orifice transversely of the tube to regulate the wall thickness of said tube.

17. Apparatus for forming organic material into a tube by heating and extrusion, comprising an extrusion head, means for forcing said material into and through said head, means in said head for imparting tubular form to said material and for exerting resistance to longitudinal flow of said tubular material around its entire circumference, means for heating said head to heat said tubular material during its passage therethrough, means for adjusting said flow resistance means transversely of said tubular material to vary the rate of flow and the time of heating of a circumferential portion of said tubular material relative to another circumferential portion thereof, a heating and feeding chamber for receiving said tubular material, an extrusion orifice and an internal forming member associated with said chamber for forming said tube, and means for relatively adjusting said member and said orifice transversely of the axis of said orifice to control the wall thickness of the extruded tube circumferentially thereof.

18. In the art of extruding through an orifice a tube of organic plastic material of a type which tends to form longitudinal weld marks and other defects when so extruded, the steps comprising subjecting such material to heat and pressure and forming a solid stream of the heat-softened material out of axial alignment with said orifice, transforming said solid stream into tubular material in axial alignment with said orifice by dividing said solid stream and sub-dividing the resulting streams individually by progression while reducing the size of said streams until capable of merging without forming weld marks or the like, distributing the streams formed by each division substantially equidistantly about the axis of said orifice and then flowing them in the general direction of said orifice for the next succeeding sub-division, then merging said streams and forming them into tubular material in axial alignment with said orifice, subjecting said streams and tubular material to heat and pressure during formation thereof, and flowing said tubular material toward and extruding it in tubular shape through said orifice.

19. Apparatus for extruding a tube of organic plastic material comprising means for subjecting such material to heat and pressure and for forming it into a solid stream, an orifice having an internal forming member associated therewith for the extrusion of the material in the shape of tube desired, a passageway for the solid stream out of axial alignment with said orifice, means for transforming said solid stream into tubular material in axial alignment with said orifice comprising separate groups of arcuate passageways of progressively increasing number arranged lengthwise of the axis of said orifice, a port for conducting the solid stream from the first-named passageway to the first group of arcuate passageways, ports leading from the ends of arcuate passageways of one group into the middle of arcuate passageways of an adjacent group, whereby said material is progressively divided into streams, some at least of the ports and arcuate passageways being of progressively diminishing size to reduce the size of the streams formed therein until capable of merging without appreciable weld marks, annular flow passage means axially aligned with said orifice for receiving said streams and merging them into tubular material and for conducting said tubular material toward said orifice, and means for heating said apparatus to heat said passageways and flow passage means and the material therein.

WILLIAM H. KOPITKE.